United States Patent [19]

Norris

[11] 3,915,420

[45] Oct. 28, 1975

[54] CABLE TRAY

[75] Inventor: George W. Norris, Syracuse, N.Y.

[73] Assignee: Crouse-Hinds Company, Syracuse, N.Y.

[22] Filed: Oct. 7, 1974

[21] Appl. No.: 512,521

[52] U.S. Cl. .................. 248/58; 248/68 R; 403/167
[51] Int. Cl.[2] ...................... H02G 3/04; F16L 3/22
[58] Field of Search .......... 174/68 C, 72 A; 248/49, 248/58, 59, 68 R, 295, 298, 299; 317/122; 403/167, 187, 245

[56] References Cited
UNITED STATES PATENTS

| | | | |
|---|---|---|---|
| 3,076,536 | 2/1963 | Tinnerman | 403/187 |
| 3,521,843 | 7/1970 | Ogle | 248/58 |
| 3,680,817 | 8/1972 | Gogan | 248/68 |

FOREIGN PATENTS OR APPLICATIONS

| | | | |
|---|---|---|---|
| 1,053,420 | 2/1954 | France | 403/167 |
| 533,640 | 5/1955 | Belgium | 403/187 |
| 1,433,718 | 2/1966 | France | 248/49 |
| 402,098 | 5/1966 | Switzerland | 248/58 |
| 127,270 | 1/1950 | Sweden | 403/245 |

Primary Examiner—Roy D. Frazier
Assistant Examiner—Lawrence J. Staab
Attorney, Agent, or Firm—Bruns & Jenney

[57] ABSTRACT

A cable tray made up of parts most of which are of extruded metal and adapted to be secured together in elongated ladder-like sections aligned longitudinally. Each section has side rails transversely spaced by longitudinally spaced inverted U-shaped rungs whose ends are interlocked in inwardly opening channels formed along the lower edges of the side rails. Generally T-shaped rotary wedges can be inserted in the rungs and turned to lock the rungs to the side rails for spacing the rungs longitudinally. An outwardly opening channel along the top edge of each side rail is adapted to be engaged by a hanger having a body conforming to the shape of the groove and having an integral flange projecting outward from the groove, the flange being perforate for engagement with a hanger rod suspended from the ceiling. Short connectors conforming to the cross-sectional shape of the grooves are provided for aligning successive sections, the connectors being secured in place in abutting side rails during erection of the tray by means of pointed setscrews.

10 Claims, 15 Drawing Figures

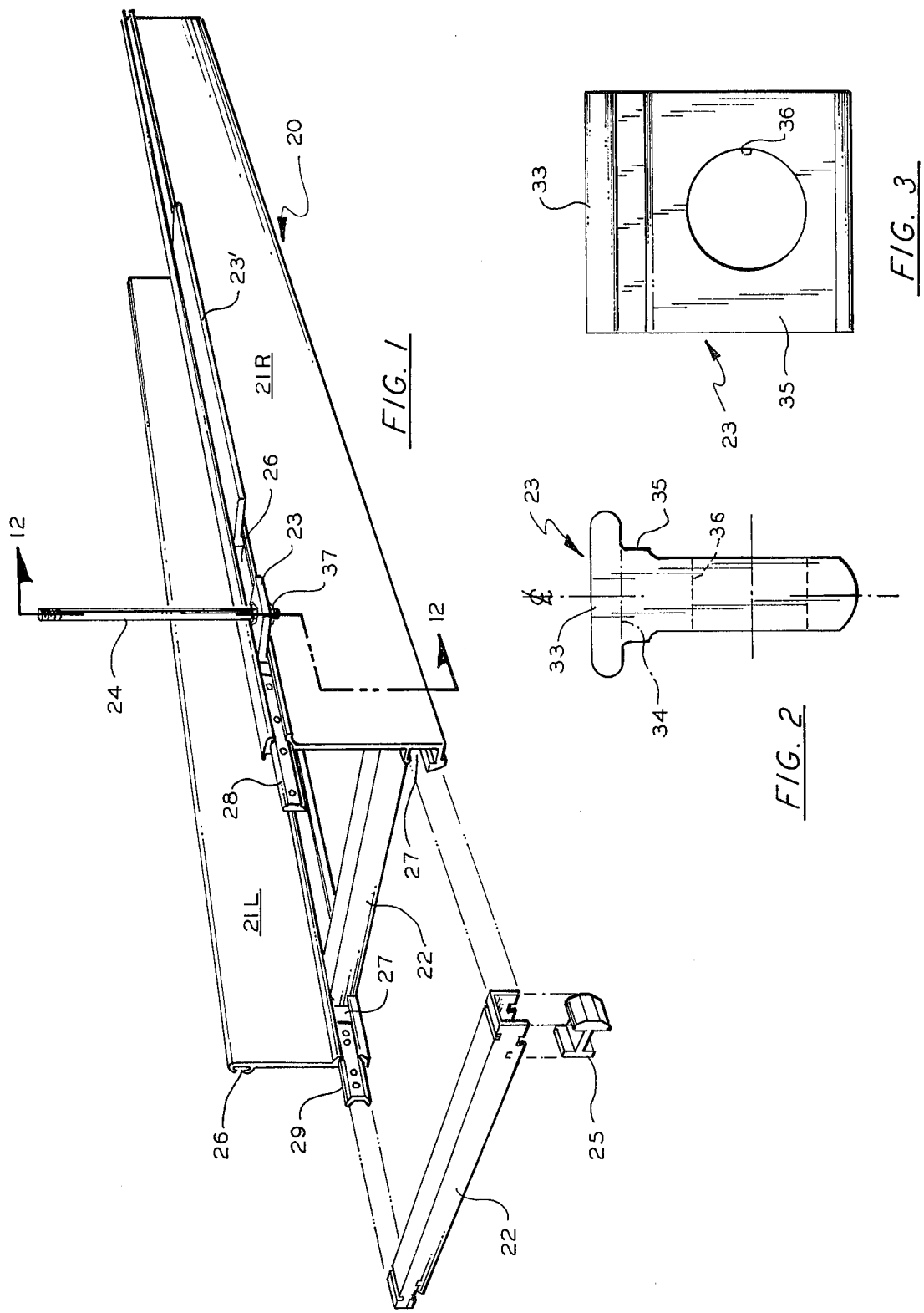

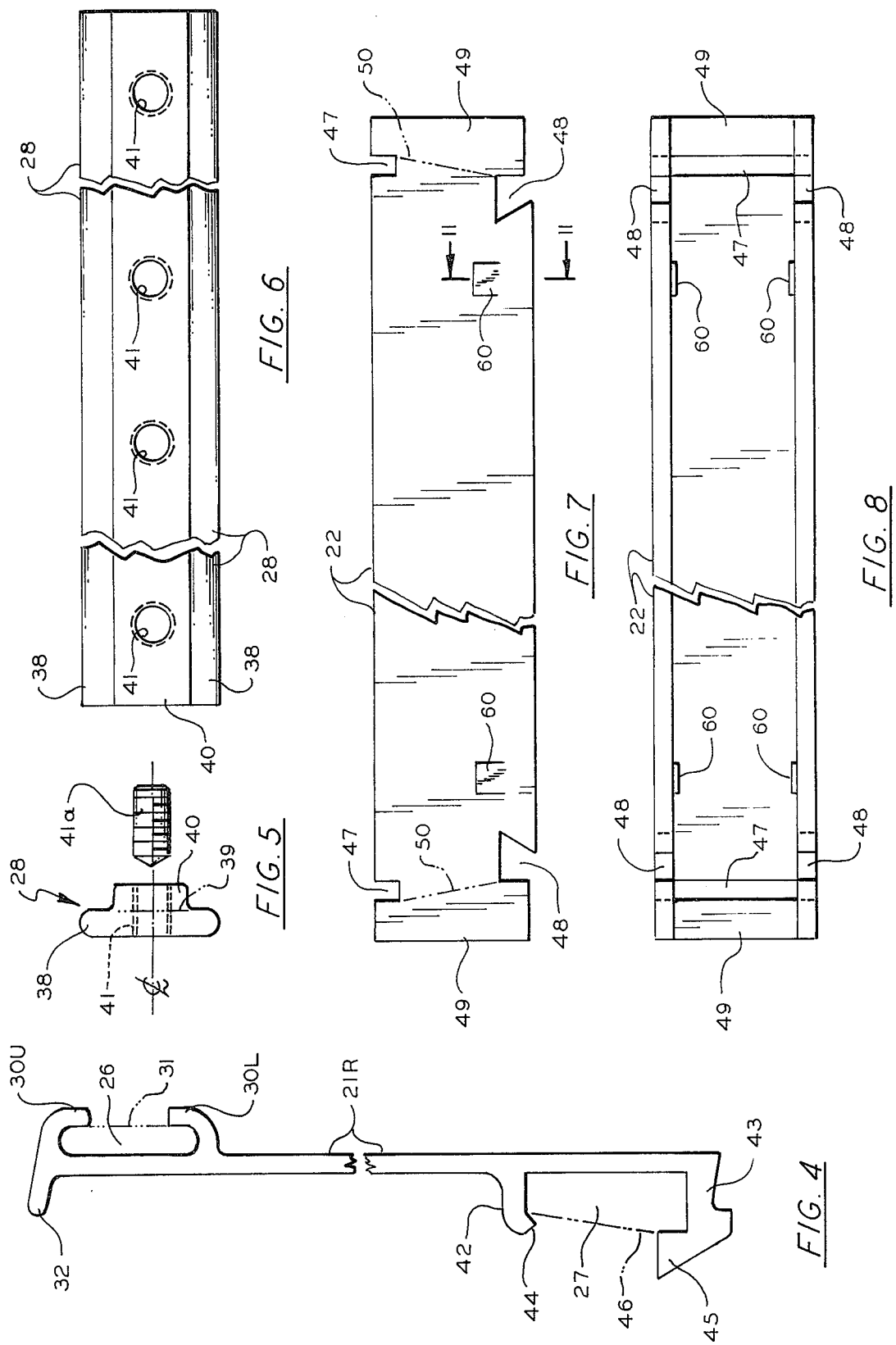

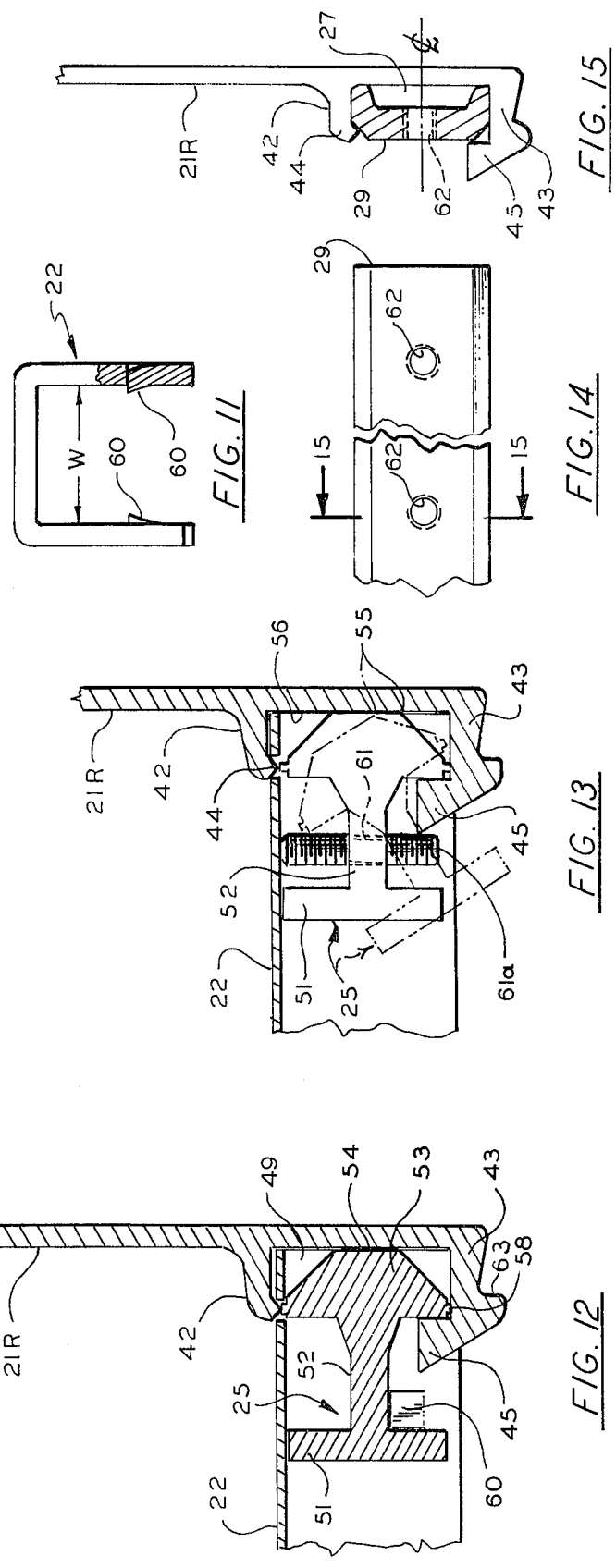

CABLE TRAY

BACKGROUND OF THE INVENTION

This invention relates generally to cable trays or cable ladders and more particularly to such cable supporting apparatus whose components are formed of extruded metal parts requiring the minimum of machining and adapted to be assembled securely without special tools to form strong assemblies of selected heights, widths and lengths for carrying electrical cables without inwardly projecting irregularities capable of injuring the protecting layers of the cables.

Many trays for supporting cables in an elevated position are known which can be assembled from component parts chosen to form trays of selected width, heights and lengths but such apparatus require costly manufacturing processes such as welding or special tools for assembly at the erection site. Many such trays have cable-contacting parts having sharp edges, such as when expanded metal or other perforate parts are used, or have fastening means for securing the parts together, such as bolts and screws, which have irregular surfaces capable of coming in contact with the supported cables and injuring their insulation.

An important object of the invention is to provide a tray whose component parts can be inexpensively fabricated and stored in different sizes and lengths at a central factory location and then shipped partially or totally unassembled to the location of use.

Another important object is to provide a tray whose side members need not be slotted or have holes drilled for connection to one another or to the rung members so that side members of a selected height and rung members of a selected length may be shipped unassembled and the rung spacing then made at the erection site using securing means requiring no special tools or apparatus for assembly.

SUMMARY OF THE INVENTION

The cable tray of the present invention has longitudinally extending side rails and transversely extending rungs laterally spacing the side rails and connecting the opposed side rails at the bottom edge of the rails, as is usual. Hanger members are also provided at the top edge of the rails for securing to hanger rods for suspending the tray from the ceiling.

The tray is assembled in sections, the side rails being of standard or specially ordered lengths and connectors are provided for longitudinally aligning the side rails of one section with those of the next. The rungs of each section may be connected at each end to the side rails of each section at the erection site and a novel rotary wedge is provided for locking each rung end to the side rail lower edge.

The side rails, rungs, hangers, connectors and wedges are each of a cross-sectional shape adapted for fashioning these members of extruded metal material, such as aluminum.

The side rails on either side have an outwardly opening groove along the top edge and an inwardly opening groove along the bottom edge. The top groove is of a generally elongated-oval cross-sectional configuration formed between outwardly projecting curved upper and lower lips, the lips being vertically spaced. The lower groove is of generally quadrilateral cross-sectional configuration formed between an inwardly projecting top flange terminating in a short, pendant, V-shaped ridge and an inwardly projecting bottom flange having a terminal, upwardly-projecting, thickened flange. The lower groove is broader at the bottom than the top.

The hanger bracket has a groove-contained body portion conforming in cross-sectional shape to the cross-sectional shape of the upper grooves and, integral with the body, has a flange adapted to project transversely outward between the upper and lower lips of the grooves. The projecting portion of the flange has a hole therethrough adapting the hanger to be suspended from the ceiling by the usual hanger rod.

The rungs are formed in an inverted-U cross-sectional configuration and, adjacent each end, have a slot across the top thereof extending transversely of the rung. The depending legs on each side of the rung adjacent each end are slotted at the bottom and this slot is of a configuration conforming substantially to the cross-sectional shape of the terminal, upwardly-projecting, thickened flange of the lower flange of the lower side rail groove. These slots are spaced from the adjacent end of the rung so that the end of the rung beyond the slots conform substantially with the cross-sectional shape of the lower side rail groove.

The rotary wedges have a cross-sectional shape substantially that of a capital T complete with serif or foot at the bottom of the vertical leg of the T, the serif being thickened and elongated to substantially the length of the cross arm of the T. The cross arm is exaggeratedly thickened at its center giving it a regular trapezoidal outline with its outer and shorter parallel side extending equidistantly on either side of a vertical centerline of the T. Both ends of the cross arm of the wedge terminate in a longitudinally extending rib which is rectangular in cross section and of a width narrower than the thickness of the cross arm end. One side of the T is a mirror image of the other side on either side of the vertical center line of the T. The cross-sectional height of each rotatable wedge in a plane normal to the cross-sectional cross arm is slightly greater than the cross-sectional length of the cross arm and the longitudinal length of the wedge in the plane normal to the cross section is equal to the width between the vertically extending flanges or legs of the rung.

In assembling each section of the tray which may conveniently be about 12 feet in length, left and right side rails of an appropriate height are chosen. Typically this overall heighth is about 11 inches but other heighths may be chosen. Rungs of an appropriate length are then chosen, a typical overall length being 24 inches, the number of rungs being supplied for each section being calculated for the specified rung spacing ordered.

At the construction site, the rung ends are inserted at the ends of the side rails with the slots in the rungs engaged with the terminal portions of the upper and lower flanges of the lower side rail grooves and the rungs are slid along the side rail for the specified spacing. The wedges at either end of each rung are then inserted between the rung depending flanges with one cross arm end in the lower end of the groove and then the wedge is rotated by hammering upward on the serif portion until the other cross arm end enters the transverse slot across the upper side of the rung and wedges against the pendant, V-shaped ridge of the top flange of the groove, the trapezoidal shape of the wedge cross arm portion being carefully dimensioned to produce this wedging action.

The hangers, typically, four or six for each section, are similarly inserted at one end of the section by inserting the hanger body into the upper groove with the suspension flanges projecting outward from the groove. The hangers are then slid along the groove to approximately their desired position, the actual position being determined by the location of the ceiling-attached hanger rods.

When two sections of tray have been completed they may be secured together or aligned by connectors, typically about 6 inches long. A pair of connectors for the upper grooves have a cross-sectional configuration conforming to the shape of the upper grooves and a pair of connectors having an outline substantially conforming to the cross-sectional shape of the lower grooves are provided for each abutting pair of sections. Each connector has a plurality of threaded holes therethrough and pointed setscrews are provided to be inserted in the threaded holes so that their pointed ends dig into the side rails to hold the connectors in position during erection.

BRIEF DESCRIPTION OF THE DRAWINGS

FIG. 1 is a fragmentary, exploded perspective view of one section of a cable tray embodying the invention;

FIG. 2 is an end elevational view and FIG. 3 is a plan view of a hanger shown in FIG. 1;

FIG. 4 is an end elevational view of a right hand side rail shown in FIG. 1, the end view of the left hand side rail being a mirror image thereof;

FIG. 5 is an end-elevational view and FIG. 6 is a fragmentary side elevational view of an upper connector shown in FIG. 1, a setscrew for use with the connector being shown explodedly in FIG. 5;

FIG. 7 is a fragmentary side elevational view and FIG. 8 is a bottom plan view of a rung shown in FIG. 1;

FIG. 9 is an end elevational view and FIG. 10 is a side elevational view of a rotary wedge shown in FIG. 1;

FIG. 11 is an end elevational view of the rung, a portion being in section on the line 11—11 of FIG. 7;

FIG. 12 is a fragmentary sectional view on the line 12—12 of FIG. 1;

FIG. 13 is a fragmentary sectional view similar to FIG. 12 showing in phantom line the rotary wedge as first inserted and prior to locking wedge;

FIG. 14 is a fragmentary side elevational view of a lower connector shown in FIG. 1; and FIG. 15 is a fragmentary end elevational view of a side rail together with a lower connector shown in section on the line 15—15 of FIG. 14.

DESCRIPTION OF THE PREFERRED EMBODIMENTS

Referring to FIG. 1, a single section or unit 20 for forming the cable tray of the invention is fragmentarily shown. The unit has a left hand side rail 21L and right hand side rail 21R, a plurality of rungs 22, a plurality of hangers 23, a plurality of hanger rods 24, and a plurality of novel rotary wedges 25. Each side rail 21 has an outwardly opening groove 26 along its upper edge and an inwardly opening groove 27 along its bottom edge.

A pair of connectors 28 for insertion in the upper grooves 26 and a pair of connectors 29 for insertion in the lower grooves 27 are provided for each section 20 for connecting it endwise to the next abutting section 20.

Referring to FIG. 4, the groove 26 is formed by a pair of spaced, curved, outwardly projecting upper and lower lips 30U and 30L, respectively, the terminal ends of the lips 30 being spaced as shown. The groove 26, to the left of phantom line 31 in FIG. 4, is of an elongated oval configuration. An upwardly and inwardly projecting and smoothly curved flange 32 may be provided for strengthening this edge of the side rail 21.

Referring to FIGS. 2 and 3, hangers 23 have a body portion 33, above the phantom line 34 in FIG. 2, which is of an elongated oval configuration conforming to the cross-sectional shape of the groove 26 and have an integral flange portion 35 adapted to project outwardly between the lips 30. Flange 35 has a hole 36 therethrough through which the usual hanger rod 24 may pass for supporting the hanger 23 by means of the nut 37 (FIG. 12).

The comparatively greater thickness in height of body portion 33 compared to the lesser thickness of flange 35, which is adapted to be closely contained in the space between lips 30, provides for the horizontal positioning of flange 35 and the securing of the hanger in groove 26. The hanger may be positioned longitudinally of the tray as desired and no other fastening means for securing the hanger in the selected position need be provided other than the weight of the tray as it is suspended from the rods 24.

Referring to FIGS. 5 and 6, a connector 28 is shown having a body portion 38, to the left of phantom line 39 in FIG. 5, conforming in shape to the cross-sectional shape of groove 26 for insertion in the groove. Integral with portion 38 is a thickened portion 40 adapted to protrude through between the lips 30. A plurality of drilled and threaded holes 41 extend through the connector in the thickened portion 40 wherein pointed setscrews 41a, shown in exploded position in FIG. 5, may be inserted for securing the connector in abutting side rails during the erection of the tray.

Referring again to FIG. 4, the lower groove 27 is formed between inwardly projecting flanges 42 and 43, the latter being the longer. The upper flange 42, at its end has a depending V-shaped portion 44 and lower flange 43 has a thickened, strengthening portion 45 at its end projecting upward from the flange 43. The cross-sectional shape of groove 27, to the right of phantom line 46, is generally quadrilateral being broader at its bottom than at its top.

Referring to FIGS. 7, 8 and 11, each rung 22 is inverted U-shaped in cross section and adjacent each end a transversely extending slot 47 across the top of the rung is adapted to contain the V-shaped portion 44 of the upper lips 42. Adjacent each end, the lower portion of each of the depending legs of rung 22 is slotted at 48, the slot being of such shape as to receive therein the portion 45 of the lower flange 43. As shown in FIG. 7, the ends 49 of each rung 22, outward of phantom lines 50, as defined by the slots 47 and 48, is quadrilateral and conforms to the cross-sectional shape of the slot 27. It will be apparent that the ends 49 of the rungs 22 may be inserted in the slots 37 at the ends of the side rail 21 and the rungs slid along the side rails to any desired location, the slots 47 and 48 engaged with the side rails for laterally spacing the same.

Referring to FIGS. 9 and 10, the rotary wedge 25 provides means for securing the rungs in position at selected positions for the desired rung spacing. The wedge 25 is generally capital T-shaped in cross section complete with an enlarged and elongated serif or foot portion 51 at the base of the vertical leg 52 of the T. The T-cross arm 53 is also thickened at its center to be regularly trapezoidal, the shorter and outer parallel side 54 of the trapezoid extending equidistantly on either side of the centerline ₵ of the T. The width W, as shown in FIG. 10, is substantially equal to the width W between the depending legs of the rung 22 as shown in FIG. 11.

As shown in phantom lines in FIG. 13, the wedge 25 may be inserted in the rung 22 at its end and then rotated clockwise. The thickness of cross arm 53 and the length of the shorter parallel side 54 is such that the end 55 of the side 54 comes in contact with the closed side 56 of slot 27, as the wedge is turned, forcing the other side of the cross arm 53 toward the inner face of the upwardly projecting end 45 of the flange 43. Rotation of the wedge 25 may be accomplished by hammering on the lower end of the serif portion 51.

As shown in FIG. 9, either end 57 of cross arm 53 terminates in a smaller rectangular ridge or flange 58 which runs along the cross arm end. As the cross arm reaches the portion 45 of flange 43, side 54 of the wedge is forced against side 56 of the groove 27 and the lower ridge 58 is forced against the flange 43 while the upper ridge 58 is forced into engagement with the V-shaped portion 44 of flange 42. The distance between portion 44 and flange 43 is made a few thousandths of an inch shorter than the distance between the outer faces of ridges 58 so that there is an actual transfer of metal at the ridges 58 when the wedge is rotated into position.

It will be noted that the ends of the serif portion 51 are elongated so that the upper end serves as a stop against the top of the rung to prevent the wedge from being rotated too far.

A preferred form of lock to prevent the accidental reverse rotation of wedge 25 is shown in FIGS. 7, 8 and 11, the depending legs of each rung at each end being lanced to form an upwardly projecting tongue 60, as best seen in FIG. 7. When the tongues are lanced they are given an inward inclination, as shown in FIG. 11. The tongues are so located that, when a rotary wedge 25 is turned to lock a rung 22 in place along a side rail 21, the tongue 60 snaps into position under the vertical leg portion 52 of the wedge to lock the wedge in its rotated position, as shown in FIG. 12.

Alternatively, the leg portion 32 of each wedge 25 may be drilled and tapped at 61, as shown in FIG. 13, and when the wedge has been rotated an appropriate screw 61a may be threaded into the hole at 61, its lower end abutting the upward projection 45 of the lower flange 43 of the rung.

Referring to FIGS. 14 and 15 a lower connector 29, as shown in FIG. 1, is provided for aligning each lower groove 27 of side rail 21 of each section with the groove 27 of the abutting side rail of the next section. The connector has a cross-sectional outline, as shown, conforming substantially to the cross-sectional shape of groove 27 and has a plurality of tapped holes 62 therethrough, as shown, adapted to each contain a pointed setscrew for holding the retainer in place during erection of the cable tray.

Each of the connectors 28 and 29 has a cross-sectional shape conforming to the cross-sectional shape of grooves 26 and 27 respectively and when the connectors are inserted in their respective grooves at the ends of abutting side rails thus effectively align the abutting side rails. The pointed setscrews secure the connectors in place in their grooves during erection of the tray but no securing of one side rail to the next is required once the tray is erected, the sections of the tray being adequately secured in place by the weight of each section supported on its rods 24.

Referring again to FIG. 12, it will be noted that the lower flange 43 is thickened adjacent its inner end providing an outwardly facing shoulder 63 against which the inner end of flange 32 at the top off the side rail may be engaged when one section 20 is stacked above another as indicated in phantom lines at the top of FIG. 12. The side rails 21 are thereby aligned and it will be apparent that a hanger rod 24 may pass through the holes 36 of a hanger 23 assembled to an upper stacked section and a hanger 23 assembled to a lower stacked section for supporting the sections in stacked relation.

Referring to FIG. 1, elongated stiffener members 23 feet may be provided, having the cross-sectional configuration of the hangers 23 feet, as shown in FIG. 2, for insertion in the upper grooves 26 of the side rails when load factors require extra strength in a tray section 20.

Referring again to FIGS. 2, 5, 9 and 15 it will be noted that a center line, marked ₵, extends along a normally horizontally extending direction in each Figure indicating that the hanger, connector or wedge in each Figure have normally upper and lower sides which are mirror images of one another. These parts may be used equally efficiently, it will be noted, either side up.

It will be noted that the construction described herein for ease in the erection of cable trays will be equally convenient for making changes in existing cable trays when structure alterations require disassembly and reerection.

It will also be apparent that curved side rails 21 may be provided for forming horizontally curved tray sections and width widening and reducer sections, rungs of varying lengths being provided for radial disposition between the side rails. Covers for the cable tray sections may be provided and means for forming vertically curved sections may also be provided and means for spacing the cables in the tray may also be added, the open-bottomed rungs 22 providing access for fastening such spacers in position.

I claim:

1. A cable tray section having elongated side rails on each side, each side rail having an outwardly-opening groove adjacent and along its upper edge and an inwardly-opening groove adjacent and along its lower edge, longitudinally spaced rung members interconnecting and laterally spacing the side members, each upper groove being defined between vertically spaced outwardly projecting curved upper and lower lips and having an elongated-oval cross-sectional configuration, a plurality of longitudinally spaced hanger brackets in each upper groove, each bracket having a body portion of elongated-oval cross-sectional configurations conforming to the cross-sectional configuration of the upper groove and an integral flange portion adapted to project transversely between the groove upper and lower lips, the flange portion having a hole therethrough adapting the flange to be secured to the lower end of a ceiling supported hanger rod, each lower groove being defined between spaced inwardly projecting upper and lower flanges, the upper flange terminating in a depending V-shaped ridge extending along the upper flange, the lower flange terminating in an upwardly projecting thickened portion extending along the lower flange, the lower groove being generally quadrilateral in cross-sectional configuration, each rung member being of an inverted-U-shaped cross-sectional configuration and having adjacent each end a transverse slot across its top and a downwardly opening slot through each side conforming to the cross-sectional shape of the upwardly projecting thickened portion of the lower groove lower flange, the downwardly opening slots and the transverse slot adjacent each rung end defining therebeyond a rung end whose configuration transverse the tray conforms to the cross-sectional configuration of the lower groove, and a rotary wedge member positioned in each rung end and having a length between its ends substantially equal to the interior width of the rung member and having a cross-sectional configuration substantially capital-T-shaped, the serif-portion of the T being thickened and elongated and the cross-arm portion of the T being trapezoidal, the shorter side of the trapezoid being at the top of the T, the cross-arm portion of each wedge being so dimensioned that when the rung end is engaged in the lower groove and a wedge is inserted in the rung with the lower end of its cross-arm portion engaged with the bottom of the lower groove and the wedge is rotated by driving the serif portion upward until the upper end of its cross-arm portion enters the transverse slot of the rung end and is in engagement with the V-shaped ridge of the lower slot upper flange, the rung end is secured to the side rail, the upper serif portion being of such length as to prevent rotation of the wedge beyond such engagement.

2. A cable tray comprising a plurality of like sections defined in claim 1, the sections being aligned in end-to-end abutting relation, the abutting ends of the side walls to abutting sections having an upper connector engaged in the upper grooves of the abutting side walls and a lower connector engaged in the lower grooves of the abutting side walls, the upper connector having a cross-sectional configuration confroming to that of the upper grooves and the lower connector having a cross-sectional outline conforming to the cross-sectional configuration of the lower grooves, each connector having a plurality of threaded holes therethrough, and pointed setscrews engaged in the threaded holes for securing the connectors in the grooves during erection of the tray.

3. The cable tray defined in claim 2 wherein each hanger bracket on either side of a cross-sectional center line through its flange portion, each rotary wedge on either side of a cross-sectional center line through its serif and cross-arm portions, and each connector on either side of a longitudinal center line have sides which are the mirror images of one another, whereby the hangers, wedges, and connectors may be inserted either side up.

4. A cable tray section adapted to be suspended from the ceiling of a structure comprising an upstanding side rail at each side, a plurality of rung members interconnecting the rails and longitudinally spaced therealong for transversely spacing the rails, each side rail having an upper flange and a lower flange projecting therefrom toward the opposite rail, the upper flange having a downwardly projecting ridge therealong at its end and the lower flange having an upwardly projecting portion therealong at its end; the upper and lower flanges, the ridge, the upwardly projecting portion and the side rail defining an inwardly opening groove of irregular cross-sectional shape extending along the rail adjacent its lower edge; each rung member being of an inverted-U-shaped configuration and having adjacent each end a slot transverse the rung across its top and a downwardly opening slot through each side conforming to the cross-sectional shape of the upwardly projecting portion of the lower flange, the downwardly opening slots and the transverse slot defining therebeyond a rung end having a configuration transverse the tray conforming to the cross-sectional shape of the groove, whereby the rung ends may be inserted in the rail grooves for spacing the rails, a rotary wedge positioned in each rung end, each wedge being of a width equal to the width between the rung sides and having a T-shaped cross-sectional configuration having a cross-arm portion and a central leg portion, the cross-arm portion having an end-to-end length greater than the distance between the upper flange ridge and the upwardly projecting portion of the lower flange of the groove, whereby the wedge is inserted in the rung with one cross-arm end in contact with the lower flange of the groove and the wedge is rotated by pressure on the leg portion until the other cross-arm end extends through the rung transverse slot and engages the upper flange ridge, the wedge leg portion having an upwardly projecting stop portion preventing further rotation of the wedge, means associated with the wedge for preventing reverse rotation of the wedge after the engagement of the other cross-arm end with the flange ridge; the side rails having outwardly projecting portions adjacent their upper edges, and hanger means secured to the rail upper edge projecting portions adapted to be secured to the structure ceiling by hanger rod means.

5. A cable tray section adapted to be suspended from the ceiling of a structure comprising an upstanding side rail at each side, a plurality of rung members interconnecting the rails and longitudinally spaced therealong for transversely spacing the rails, each side rail having an upper flange and a lower flange projecting therefrom toward the opposite rail, the upper flange having a ridge downwardly projecting therealong and the lower flange having an upwardly projecting edge therealong; the upper and lower flanges, the ridge, the upwardly projecting flange and the side rail defining an inwardly opening groove generally quadrilateral in cross section extending along the side rail adjacent its lower edge; each rung member being of an inverted-U-shaped configuration and having adjacent each end a slot transverse the rung across its top and a downwardly opening slot through each side conforming in shape to the cross-sectional shape of the upwardly projecting edge, the downwardly opening slots and the transverse slot defining therebeyond a rung end having a configuration transverse the tray conforming to the cross-sectional shape of the groove, whereby the rung ends may be inserted in the rail grooves at the rail ends for spacing the rails, and a rotary wedge positioned in each rung end, each wedge having a length between ends equal to the distance between the rung sides and having a capital-T-shaped cross-sectional configuration having cross-arm and central leg portions, the cross-arm portion having an end-to-end length greater by a few thousandths of an inch than the distance between said ridge and said upwardly projecting edge; whereby, when the wedge is inserted between the rung sides with one cross-arm end in contact with the lower flange of the groove and the wedge is rotated by upward force on the leg portion until the other cross-arm end extends through the rung transverse slot and wedgingly engages the upper flange ridge, the wedge is engaged with the side rail for securing the rung to the side rail for longitudinally positioning the rung; the wedge cross-arm portion being thickened at its center for forcing the lower cross-arm end against said upwardly projecting edge when the upper cross-arm end engages the upper flange ridge, the wedge leg portion having at its end an upwardly projecting stop portion which when it meets the rung top prevents further rotation of the wedge; means associated with the wedge for preventing reverse rotation thereof after the wedging engagement of its upper cross-arm end with the upper flange ridge; the side rails having outwardly projecting portions adjacent their upper edges, and hanger means secured to the rail upper edge projecting portions adapted to be secured to the structure ceiling by hanger rod means.

6. The cable tray section defined in claim 5 wherein the cross-arm portion of the wedge comprises comparatively small, terminal flange portion along their ends, the terminal flange portions being rectangular in cross section, and the groove terminal downwardly projecting ridge is V-shaped in cross section, whereby, when the wedge is rotated until its upper cross-arm end wedgingly engages the upper flange ridge, there is a transfer of metal between the V-shaped ridge and the terminal flange portion of the upper cross-arm end.

7. The cable tray section defined in claim 6 wherein the means for preventing reverse rotation of the wedge comprises, each rung side adjacent each of its ends having an inwardly struck tongue projecting upward, the tongue being located so as to have its upper end adapted to be moved under and into engagement with the wedge central leg portion when the wedge is rotated to a position with its upper cross-arm end in wedging engagement with the upper flange ridge.

8. The cable tray section defined in claim 6 wherein the means for preventing reverse rotation of the wedge comprises, each wedge having a threaded hole through its central leg portion, and, after the wedge is rotated to its wedgingly engaged position, a screw is engaged in the threaded hole, the threaded screw hole being so located and the screw being of such length that its lower end is in abutting engagement with the groove terminal upwardly projecting flange.

9. The cable tray section defined in claim 5 wherein each rotary wedge has sides which are the mirror image of one another on each side of a center line extending longitudinally along the wedge central leg portion, whereby the wedge may be inserted between the rung sides equally effective either side up.

10. The cable tray section defined in claim 5 wherein each side rail has in inwardly projecting flange along its upper edge, and each side rail lower flange is thickened adjacent its end forming an outwardly facing shoulder, whereby sections may be nested one above the other, the outwardly facing shoulders of the upper side rails being engaged by the inwardly projecting flanges of the lower side rails.

* * * * *